United States Patent [19]

Misawa

[11] Patent Number: 4,681,330
[45] Date of Patent: Jul. 21, 1987

[54] HAND TRUCK
[75] Inventor: Rintaro Misawa, Tokorozawa, Japan
[73] Assignee: Sunwa Sharyo Manufacturing Co., Ltd., Tokyo, Japan
[21] Appl. No.: 807,571
[22] Filed: Dec. 11, 1985
[30] Foreign Application Priority Data Dec. 14, 1984 [JP] Japan ............................ 59-189580[U]

[51] Int. Cl.⁴ .............................................. B62B 1/08
[52] U.S. Cl. .................. 280/47.2; 280/47.21; 280/47.27
[58] Field of Search ................ 280/47.2, 47.12, 47.22, 280/47.21, 47.27; 403/104, 229, 373

[56] References Cited

U.S. PATENT DOCUMENTS 3,603,623  9/1971  Widman ................... 403/104
3,655,212  4/1972  Krass ..................... 280/47.2
4,091,942  5/1978  Shelton ................... 280/47.2

FOREIGN PATENT DOCUMENTS 1043136  11/1953  France ................... 280/47.2
705648   3/1954   United Kingdom ......... 280/47.2

Primary Examiner—David M. Mitchell
Attorney, Agent, or Firm—Martin A. Farber

[57] ABSTRACT

A hand truck has a load supporting frame having a handle, and a load supporting platform provided on a lower portion of the load supporting frame. A pair of main wheels are provided on a lower portion of the load supporting frame, and an auxiliary frame is pivotally mounted on a lower portion of the load supporting frame. A pair of auxiliary wheels are provided on ends of the auxiliary frame. An extensible cylinder device is provided between the load supporting frame and the auxiliary frame so as to change the angle there-between.

5 Claims, 8 Drawing Figures

HAND TRUCK

BACKGROUND OF THE INVENTION

The present invention relates to a simply constructed hand truck with a load supporting member and a platform.

With respect to the prior art, a hand truck provided with a forwardly protruding platform, a pair of wheels beneath the platform, and a handle is known. When such a conventional cart or truck is used, the operator is required to adjust the inclination of the platform and the height of the handle according to the weight or size or shape of the load and to the height of the operator, without any particular adjusting means, in order to provide for a stable transportation of loads.

SUMMARY OF THE INVENTION

Therefore, the object of the present invention is to provide a hand truck in which the inclination of a load supporting member and the height of the handle can be properly set by simple operation according to the center of gravity of the load.

According to the present invention, there is provided a hand truck comprising a load supporting frame having a handle, a platform provided on a lower portion of the load supporting frame, a pair of main wheels provided on a lower portion of the load supporting frame, an auxiliary frame pivotally mounted on a lower portion of the load supporting frame, a pair of auxiliary wheels provided on ends of the auxiliary frame, extensible cylinder means provided between the load supporting frame and the auxiliary frame so as to keep the load supporting frame at a desired position, and operating means for operating the cylinder means.

In an aspect of the invention, the cylinder means comprises a cylinder, a rod slidably mounted in the cylinder, and a spring wound on the rod and secured to the cylinder at both ends thereof so as to lock the rod. Also, there is provided cylinder operating means which comprises a wire for expanding the spring to release the rod, and a lever for pulling the wire.

Other objects and features of this invention will become understood from the following description with reference to the accompanying drawings.

DETAILED DESCRIPTION OF THE PREFERRED EMBODIMENTS

Figure 1:
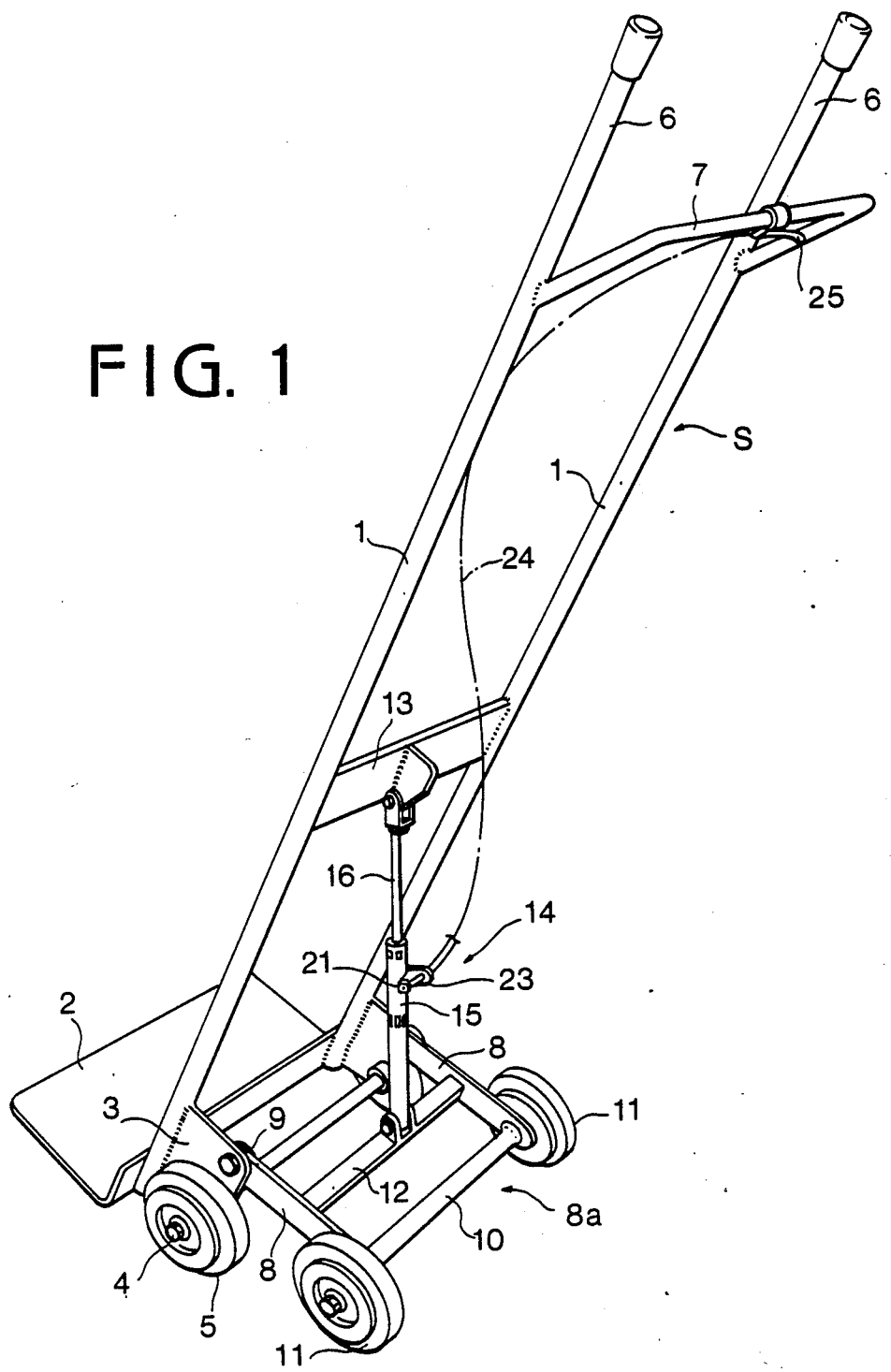
FIG. 1 is a perspective view of a hand truck according to an embodiment of the present invention.

Referring to FIGS. 1-5 showing an embodiment of the present invention, the hand truck comprises a pair of load supporting members 1 forming a load supporting frame S, a load supporting platform 2 which is protruding forwardly from lower ends of the members 1 for receiving loads, and a pair of brackets 3 which protrude backwards at the lower ends of the load supporting members 1. On each bracket, a wheel 5 is supported by an axle 4. Further, a main handle 6 and an auxiliary loop handle 7 are integrally provided at the upper part of each load supporting member 1. A pair of rotary arms 8 are pivotally attached on the brackets 3, respectively, by bolts 9. A shaft 10 is secured to the ends of the arms 8 to form an auxiliary frame 8a. A pair of auxiliary wheels 11 are pivotally supported on both ends of the shaft 10 which is secured to the rotary arms 8 at opposite ends to the ends attached to the load supporting members 1. A connecting member 12 is further provided between the rotary arms 8 in parallel to and between the axle 4 and shaft 10. Pivotally connected to the connecting member 12, and also to and another connecting member 13 secured between the load supporting members 1, is a cylinder means 14 which consists of a cylinder 15 and a rod 16. The rod 16 is telescopically expandable in the cylinder 15 without hydraulic power or any other power and can be locked at a desired point as described hereinafter.

Figure 2:
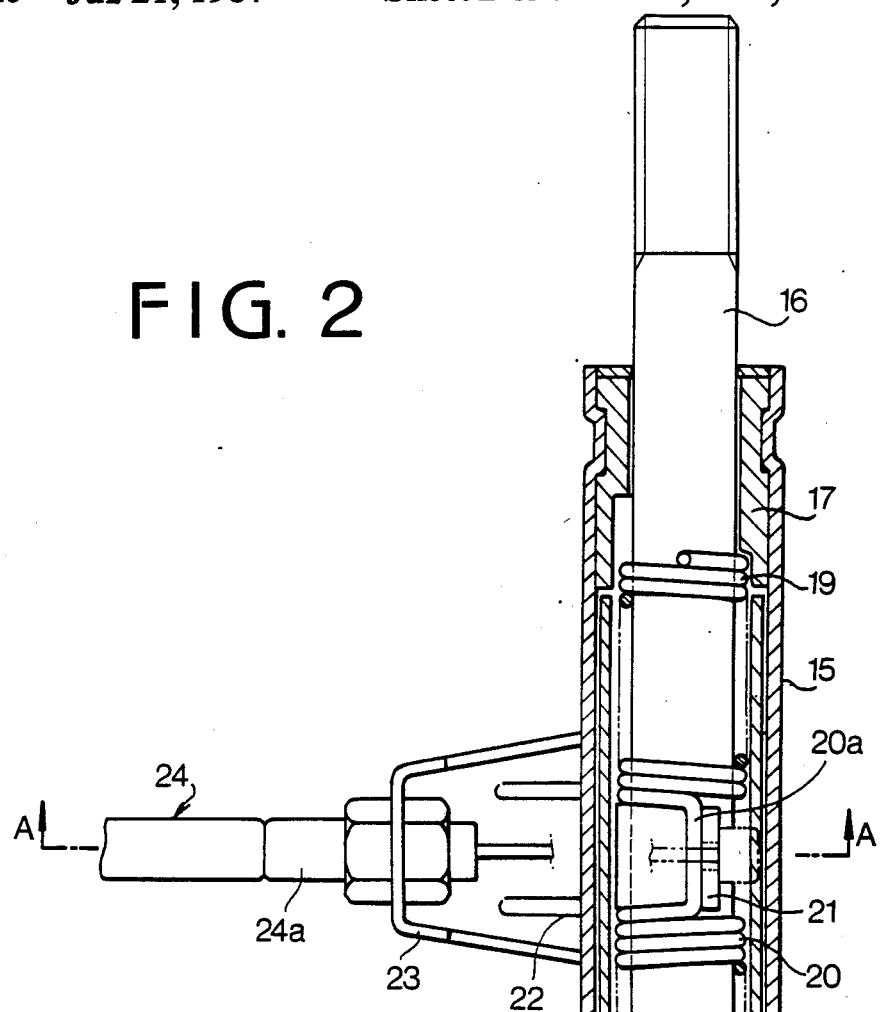
FIG. 2 is a sectional view showing a principal part of a cylinder means.
Figure 3:
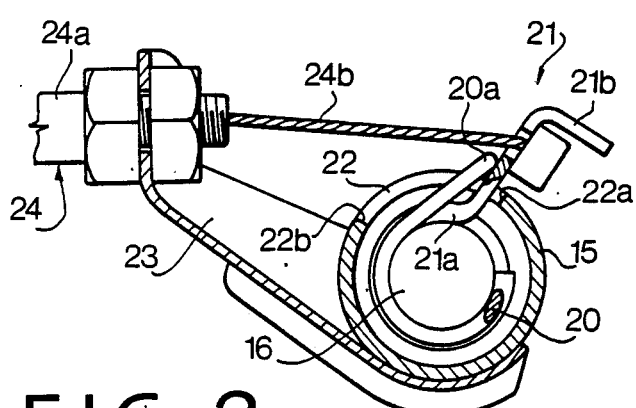
FIG. 3 is a sectional view taken along a lien A—A of FIG. 2.

Referring to FIGS. 2 and 3, bearings 17 and 18 are fitted inside of the cylinder 15 at a certain interval, and the telescopic rod 16 is slidably mounted in both of the bearings 17 and 18. A coil spring comprising coil springs 19 and 20 is mounted on the rod 16. Both springs 19 and 20 are wound around the rod 16 in the opposite direction with binding force. Both ends of the springs are fixed to the bearings 17, 18 respectively. The central portion 20a between the springs is engaged with a releasing lever 21. The releasing lever 21 has a cylindrical portion 21a which is wound around the rod 16, and an end portion 21b which protrudes out through an aperture 22 formed in the cylinder 15. When the lever 21 is released, the springs 19 and 20 press the lever 21 towards an end portion 22a of the aperture 22, so that springs 19 and 20 are tightly wound around the rod 16. On the other hand, when the lever 21 is moved to the opposite direction until the end portion 21b is arrested by the other end portion 22b of the aperture 22, the coil springs 19 and 20 are expanded, so that the rod 16 becomes free to move. Thus, while the lever 21 is being released, the rod 16 is kept in its position wherever it is.

The lower end of a tube 24a of an actuating wire 24 is secured on a bracket 23 on the cylinder 15, and its upper end is secured to the loop handle 7. The lower end of an inner wire 24b is connected to the end portion 21b of the release lever 21 and the upper end is secured to a lever 25 provided on the handle 7.

Figure 4:
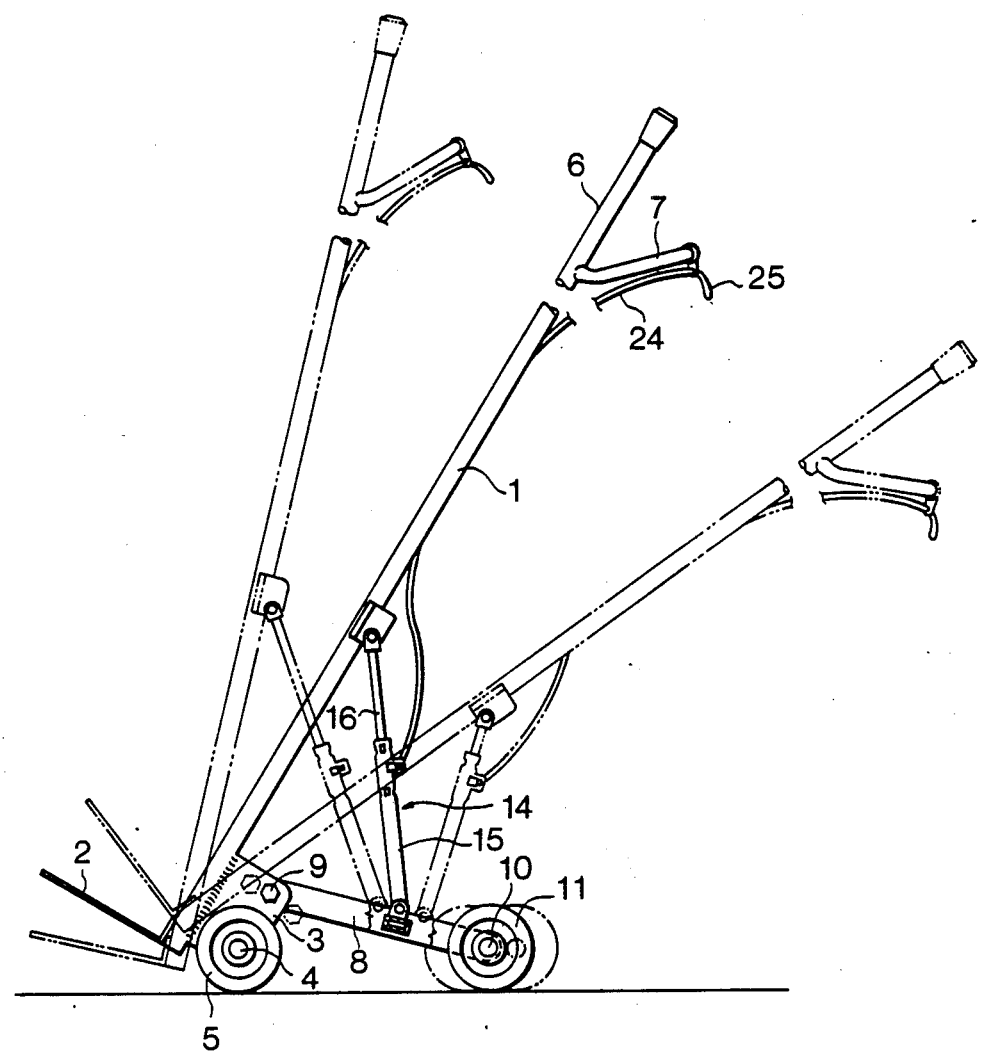
FIGS. 4 and 5 are illustrations to explain the operation of the hand truck.

When the actuating lever 25 is grasped, the inner wire 24b is pulled and accordingly, the releasing lever 21 is also pulled toward the end position 22b of the aperture 22, so that the rod 16 becomes free to move smoothly in the cylinder 15, as explained above. To the contrary, when the actuating lever 25 is released and the release lever 21 returns to the end position 22a of the aperture 22, the rod 16 is held by the force of the coil springs 19, 20 at any proper length. Thus, the entire length of the cylinder means 14 is adjusted to adjust the position of auxiliary wheels 11. Consequently, by simple operation of the actuating lever 25, the operator can choose a proper inclination of the load supporting frame S. As a result, the load supporting frame S rotates about the axles 4 to form a desired angle relative the ground, causing the rotary arms 8 to rotate around the supporting bolt 9 until the auxiliary wheels 11 come into a desired position as shown in FIG. 4.

Figure 5:
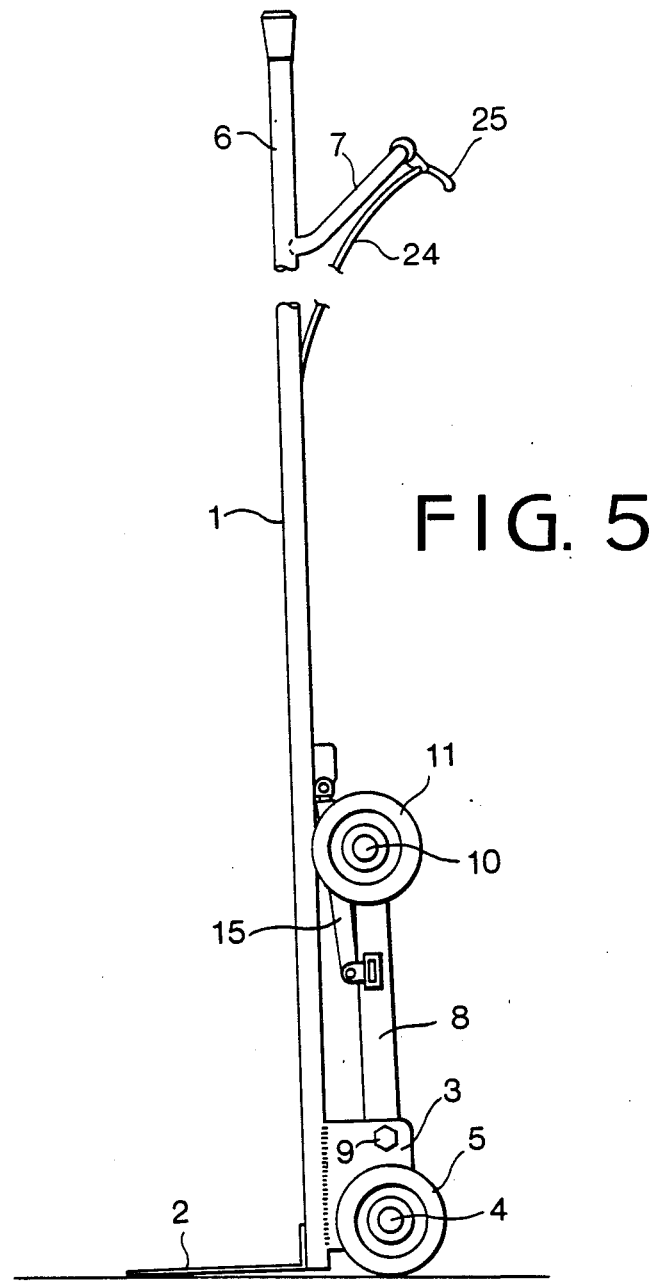

A shown in FIG. 5, the rotary arms 8 can be rotated relative to the members 1 by retracting the rod 16 to the shortest position, so that the entire hand truck can be held upright so as to be stored in a narrow space while it is not used. On the other hand, when the hand truck is used, the load supporting frame S is set to a proper position which is selected according to the size or position of the center of gravity of the load on the platform 2. Further, the height of the main and sub auxiliary loop handles 6 and 7 are adjusted according to the height of the operator. Such operations can be easily carried out by operating the actuating lever 25 on the loop handle 7. A load is transported on a staircase by supporting the hand truck on the auxiliary wheels 11, keeping the cylinder means 14 in a fully extended position to lift the wheels 5, then advancing with the auxiliary wheels 11, whereupon the wheels 5 are mounted on the first step of the staircase. Next, the hand truck is rotated about the wheels 5, and advanced with the wheels 5 lifting the wheels 11 slightly higher than the first step, whereupon the wheel 11 is mounted on the step. This operation is repeated to climb the staircase.

When descending, firstly, the cylinder means 14 is retracted, and the truck is advanced as the members 1 are inclined backwards and the wheels 5 are quietly lowered from the top of the staircase to the next step, and then proceeding with the wheels 5. When the actuating lever 25 is gripped and the rod 16 is released, the auxiliary wheels 11 are lowered by own weight. Thus the wheels 11 reach the next step. Such operation is repeated, and the hand truck can descend the staircase.

Figure 6:
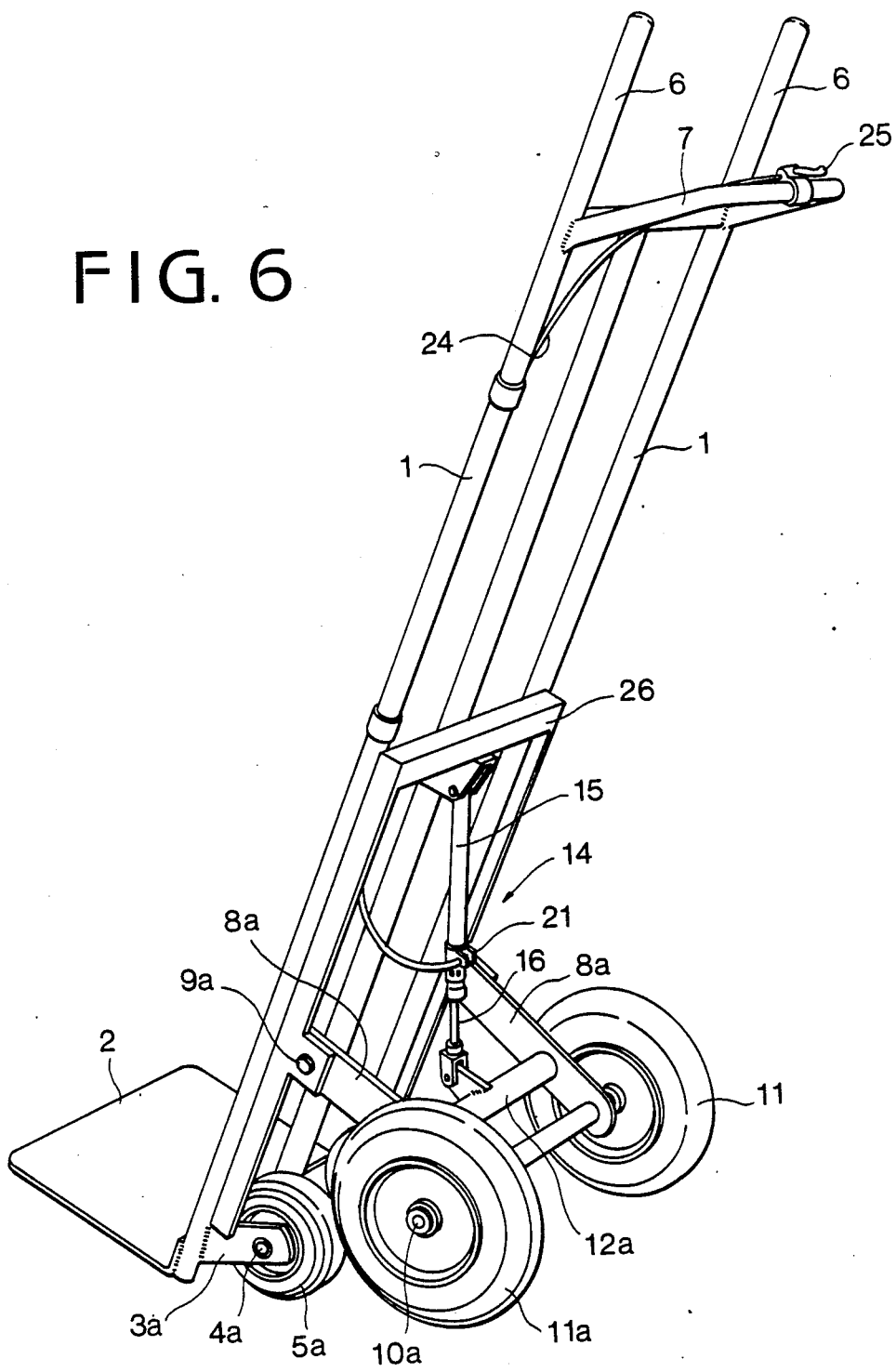
FIG. 6 is a perspective view of a hand truck according to another embodiment of the present invention.
Figure 7:
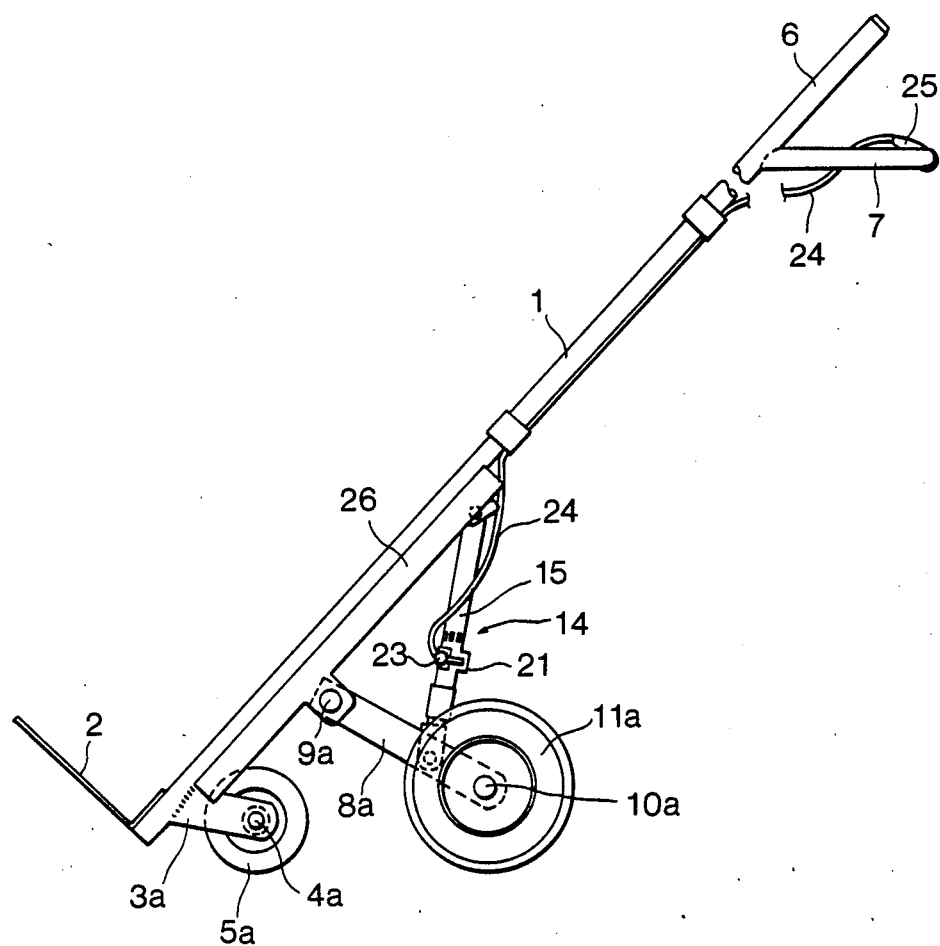
FIGS. 7 and 8 are illustrations to explain the operation of the hand truck shown in FIG. 6.
Figure 8:
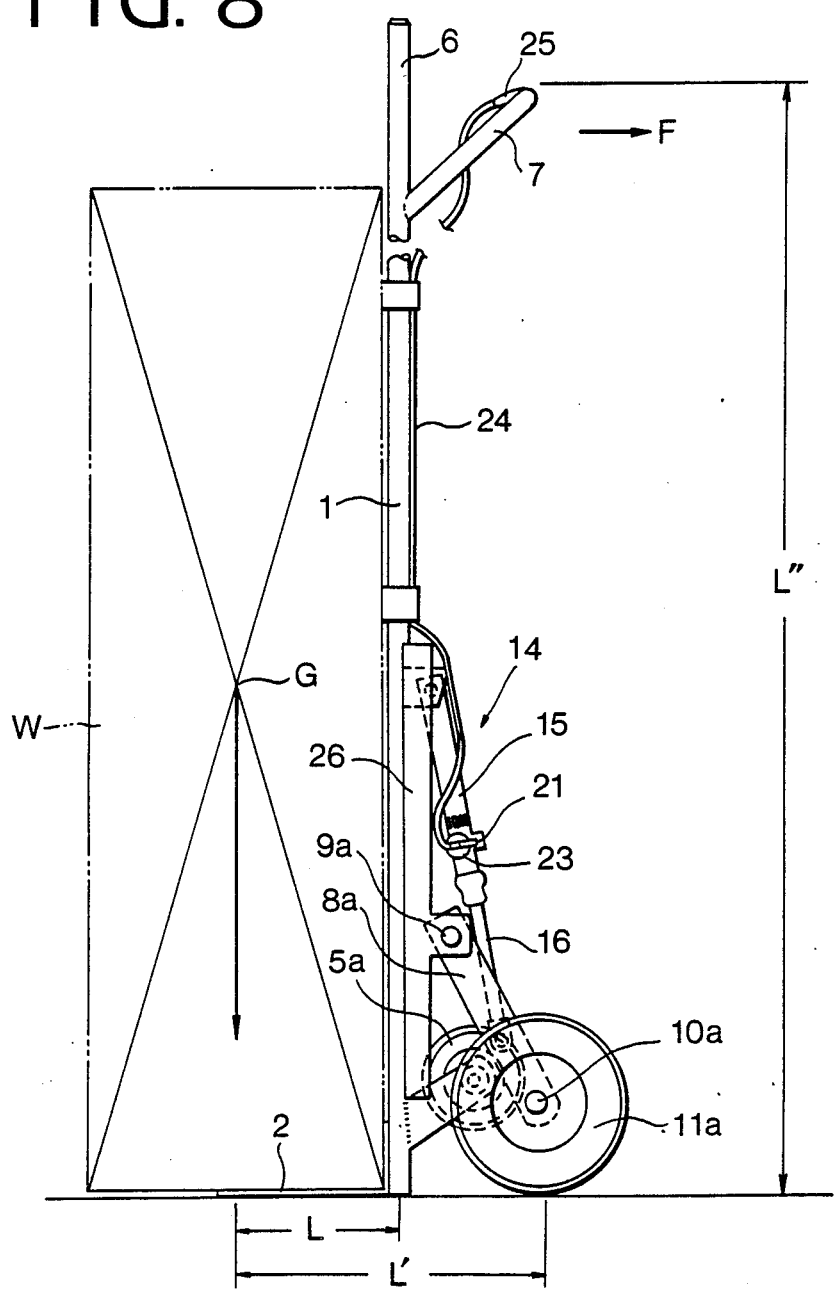

Another embodiment of the present invention is described as follows with reference to FIGS. 6-8. As shown in FIG. 6, a pair of brackets 3a protrude backwards at the lower ends of the load supporting member 1. Wheels 5a are provided by axles 4a. The wheels 5a are set just inside of the load supporting members 1. Further, an inverted U-shaped frame 26 is secured to the load supporting members 1.

Upper ends of rotary arms 8a are pivotally supported on the frame 26 by bolts 9a, and a pair of the auxiliary wheels 11a are pivotally supported on the other ends of rotary arms 8a by shafts 10a. The auxiliary wheels 11a are designed to be larger in diameter than the wheels 5a (they can also be the same size). The upper end of the cylinder 15 of the cylinder means 14 is secured to the upper side member of the frame 26 through a bracket. The other members of the hand truck in the second embodiment are the same and have the same reference numerals as the first embodiment.

When the operator grips or releases the actuating lever 25, the cylinder means 14 can be extended or retracted, so that the height of the handle is adjusted. When the lever 25 is gripped, the telescopic rod can be extended by the weight of the auxiliary wheels 11a.

In this embodiment, similar to the first embodiment, the hand truck can be compactly folded so that it can be stored in a small space when it is not used. Further, as shown in FIG. 8, since the auxiliary wheels 11a are provided keeping a considerable distance from the load supporting members, it is possible to stably keep a load W on the platform 2 even when the load supporting members 1 stand vertically while not in use, keeping balance between the load and the auxiliary wheels 11a. The reason is because the distance L' between the center of gravity of the load W and the grounding point of the auxiliary wheels 11a is sufficiently longer than the distance L between the center of the gravity of the load W and load supporting members 1.

When the upright hand truck is moved, the main or loop handle 6 or 7 is pulled down in the direction shown by the arrow F, the actuating lever 25 is operated at the same time to retract the cylinder means 14, whereupon the load supporting members 1 incline balancing the load W. Wheels 5a land on the ground and auxiliary and wheels 11a come into a position which is proper for supporting the load W, whereupon the cylinder 14 is locked as the actuating lever 25 is released.

Since the height L" of the handle is sufficiently higher than the above-mentioned length L, the operator can easily tilt the load supporting members 1 to a properly inclined position.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A hand truck comprising:
   a load supporting frame having a handle at an upper end portion thereof;
   a load supporting platform provided on a lower portion of the load supporting frame;
   a pair of main wheels provided on a lower portion of the load supporting frame;
   an auxiliary frame pivotally mounted on a lower portion of the load supporting frame;
   a pair of auxiliary wheels provided on a trailing end of the auxiliary frame;
   extensible cylinder means provided between the load supporting frame and the auxiliary frame so as to keep the load supporting frame at a desired position, the cylinder means including a cylinder and a rod slidably mounted in the cylinder, one of said cylinder and rod being pivotally connected at a lower end thereof to the auxiliary frame at a location inboard of said trailing end, and a spring wound on the rod and secured to the cylinder at both ends thereof so as to lock the rod by contraction thereof, the other of said cylinder and rod being pivotally connected to the load supporting frame at a connection position lower than a half of the length of the load supporting frame; and
   operating means for operating the cylinder means, said operating means including a wire for expanding the spring to release the rod, and a lever provided on the handle for pulling the wire to release the rod.

2. The hand truck according to claim 1, wherein said auxiliary frame is pivotable to a stow position alongside said load supporting frame.

3. The hand truck according to claim 2, wherein, in said stow position, said auxiliary frame lies adjacent said connection position.

4. The hand truck according to claim 3, wherein said auxiliary frame connects to said supporting frame at a location adjacent said main wheels.

5. The hand truck according to claim 3, wherein said auxiliary frame connects to said supporting from at a location distant from said main wheels.

* * * * *